United States Patent Office 2,763,682
Patented Sept. 18, 1956

2,763,682

PURIFICATION OF CHLORTETRACYCLINE

Robert Winterbottom, Pearl River, Peter Eichler, New City, N. Y., and Charles Pidacks, Montvale, N. J., assignors to American Cyanamid Company, New York, N. Y., a corporation of Maine No Drawing. Application March 3, 1954, Serial No. 413,946

5 Claims. (Cl. 260—559)

This invention relates to a process for the purification of chlortetracycline, and obtaining chlortetracycline as neutral chlortetracycline or its alkali salts, and has for its general object an improvement in methods of obtaining chlortetracycline.

The novel method is particularly useful in converting various forms of chlortetracycline to comparatively pure neutral chlortetracycline or its alkaline salts. The method is also useful in improving the purity of crude chlortetracycline. As a result, the chlortetracycline has better appearances, and is more acceptable from a therapeutic point of view. The more highly purified products are more desirable for therapeutic purposes because extraneous materials which may be present in some cases cause undesired physiological side reactions.

This application is a continuation-in-part of our copending application Serial Number 142,074, filed February 2, 1950, now Patent Number 2,671,806, March 9, 1953 entitled "Purification of Chlortetracycline."

Chlortetracycline is produced and sold under the commercial designation "Aureomycin," which, in certain countries, is a trademark of the American Cyanamid Company. Chlortetracycline has been found to be a naphthacene derivative and while having a structure which strongly suggests tautomeric forms, is believed to exist with the following probable structure:

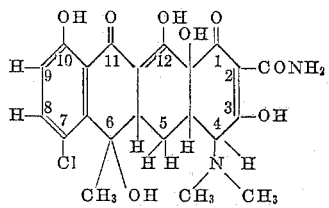

A numbering system is shown. The name under which the compound is indexed in Chemical Abstracts is 7-chloro-4-dimethylamino-1,4,4a,5,5a,6,11,12a-octahydro-3,6,10,12,12a-pentahydroxy-6-methyl-1,11-dioxo-2-naphthacenecarboxamide [Chemical Abstracts, vol. 46, page 13363 (1952)]. Other numbering systems have been used in other U. S. patents, such as 2,658,077, and elsewhere. The accepted generic term for the compound is chlortetracycline. Chlortetracycline is produced by growing Streptomyces aureofaciens as described and claimed in Patent 2,482,055, September 13, 1949 to B. M. Duggar entitled "Aureomycin and Preparation of Same." As so produced, certain contaminants and impurities are present, which can be called fermentation mash impurities. The present process removes such fermentation mash impurities to give a purer chlortetracycline.

Chlortetracycline is a very unusual antibiotic in that it is amphoteric, having both acidic and basic groups in its molecule, and accordingly at times acts as an acid, and at times acts as a base. Accordingly, methods previously used to purify acid or basic antibiotics are not generally useful for chlortetracycline. Additionally, it has certain very special properties because there is a tendency towards partial polymerization or rearrangements which inactivate the chlortetracycline unless it is treated particularly gently.

Because of the unstable and amphoteric properties of chlortetracycline, it has been necessary to use an entirely different concept of purification than has ever been previously known in the study of antibiotics. Additionally, certain of the impurities have a tendency to remain with the chlortetracycline when using ordinary methods of purification; but by purification in accordance with the procedures of this invention, it is possible to obtain high yields of therapeutically acceptable material; obtaining the chlortetracycline as the neutral chlortetracycline, or as a salt with an alkali base, for example, a sodium salt, each of which have particular advantages for therapeutic use, depending upon the condition to be treated, the mode of administration, etc.

An object of this invention is to prepare the chlortetracycline in a therapeutically effective form with the largest practical yield, in as cheap and efficient a manner as possible. Furthermore, it is an object of this invention to prepare the alkali salts, or the neutral chlortetracycline which may be desired for a particular medical treatment, with the least expensive and troublesome modification of the purification procedure. By following the purification procedures of this invention, it is possible for the preliminary steps, solution, filtration, and so on, to be carried out under identical conditions, independent of the desired final product form, and the conversion to the desired final form be accomplished shortly before the final isolation of the purified material, so that a major process modification is not necessary to obtain the particular form of chlortetracycline which may be then desired.

Neutral chlortetracycline and the sodium salt are also highly satisfactory for therapeutic use and may be obtained in crystalline form of high purity by the process of the present invention. Other salts of chlortetracycline with bases such as the potassium salt, the ammonium salt, the lithium salt, the cesium salt, the rubidium salt, and the monoamine salts are all easily prepared through the use of our process, and where conditions justify, or under circumstances where the medical profession prefers them, such salts are easily made by following the procedures taught by this invention, and are included within its scope.

Chlortetracycline has been processed in aqueous solution, and has been extracted therefrom by the use of suitable solvents and recovered from the solvent by evaporation of the solvent, etc. We have discovered that the product may be separated from solvents after suspending the chlortetracycline in the solvent and causing it to dissolve by shifting the pH to an appropriate point. When an alkali salt is desired, it is convenient to use the corresponding base in the solubilization of the chlortetracycline. When neutral chlortetracycline is to be prepared, it is more convenient to use a nitrogeneous base for the pH control, or it is easier to prevent local over alkalinization and the residual base is more easily removed from the desired material.

A great many of the impurities naturally present at the time of the original formation of chlortetracycline will be found to be comparatively insoluble in this alkalinized solution and may be removed by filtration; and many materials, particularly the color bodies present, may be adsorbed upon a charcoal or diatomaceous earth which may be present. An activated charcoal, such as Darco G-60, is found to be very satisfactory. From this alkalinized solution, the chlortetracycline may be recovered in the desired form by altering the system characteristics.

To obtain the neutral chlortetracycline, the preferred range is between about a pH of about 4 and a pH of about 7.5 with a pH of about 6 giving particularly effective results. To obtain the chlortetracycline as an alkali salt such as, the sodium, potassium, lithium, cesium, rubidium, ammonium, or mono-amine salt, the chlortetracycline may be recovered from the solution as formed within the range of about 8 to 10. The chlortetracycline in the desired form is caused to become insoluble by the shift in the pH, combined with a change in the solvent system and the temperature. Below a pH of about 4, at least some of an acid salt of chlortetracycline is also obtained. In the range of about 7.5 to 8 some neutral chlortetracycline is obtained with the alkali salt. These ranges may be used if mixtures are desired, or the mixtures may be separated by partial crystallization.

Among the polar solvents which are suitable are such solvents as methyl alcohol, ethyl alcohol, higher alcohols, 2-methoxyethanol, 2-ethoxyethanol, (alkoxyalkanols) ethylenechlorhydrin, dioxane, carbitol, ethylene glycol, benzyl alcohol, nitromethane, acetonitrile, propylenechlorhydrin, di-acetone alcohol, acetophenone, 2-methoxyethyl acetate, and mixtures of two or more of these solvents. The lower alkoxyalkanols and lower alcohols are generally preferred because the chlortetracycline has better solubility characteristics herein. Methyl alcohol and 2-methoxyethanol and 2-ethoxyethanol are particularly effective as they are readily obtainable commercially, and are comparatively inexpensive. If for any reasons these lower members are unavailable, or for other commercial reasons others are desirable, the higher members may be very effectively used. Ethyl alcohol and methyl carbitol are among the solvents which are very effective, although somewhat more expensive. A little water in these solvents, often increases the solubility of the chlortetracycline and permits the usage of smaller solvent volumes. Addition of larger amounts of water up to the limits of miscibility aids in the crystallization of the neutral chlortetracycline or its alkali metal salts. Excellent yields of neutral chlortetracycline are obtainable by dissolving the crude chlortetracycline in anhydrous methanol or ethylenechlorhydrin followed by the addition of water. Inactivation of the chlortetracycline is usually less with less water present, particularly at the higher temperatures or at the more alkaline ranges.

Solubilities are among the most obscure of all known properties of a material. It is frequently found that, for no apparent reason, slight changes in the structure of the product or of the solvent will cause large changes in the relative solubilities. It is particularly surprising that, particularly with the mono-amines, and other nitrogenous bases such as ammonia, to neutralize the acid group on the chlortetracycline and the acidic radical of any salt which may be present, the solubility of the chlortetracycline in hydroxylated and ethereal organic solvents is increased to such a remarkable extent. However, it is not a sharp phenomenon, and the amounts of ammonia or amines to solubilize, and the exact pH's, vary to some extent with the concentration and solvent which is being used.

The neutral chlortetracycline may be used as the starting material rather than an acid salt, in which case a smaller quantity of the base is required for effective solubilization. The quantity of base to be used may either be on a calculated basis from the purity and quantity of chlortetracycline which is being used, or it may be by an actual measurement of the pH involved. For the determination of pH of non-aqueous solutions, the term pH in and of itself, to a large extent loses its significance; but as a practical operating value, it is found that by diluting an equal volume of a solvent with water and then measuring the pH of the aqueous layer, if immiscible, or the mixture, if miscible, with a standard glass electrode, there is obtained a reading of pH, or acidity and basicity, which is in effect a very useful figure, even though it may not exactly come within the scope of the classic definition of that which is meant by pH as originally defined. For the purposes of this invention, where a non-aqueous solvent is being used, the figure obtained in this manner is referred to as the pH of the solution.

The amines are more desirable than the metallic alkalis if neutral chlortetracycline is to be recovered. It is desirable that a non-toxic amine be used, and preferably one of low molecular weight and low cost so that the expense involved will be a minimum, the quantity will be a minimum, and the necessity for a thorough removal of the amine will be at a minimum. Of course, by suitable precautions any of these factors may be neglected if considered desirable for a specific set of conditions. Ammonia is, of course, considered the first member of the family of amines, or nitrogenous bases, in which none of the hydrogens are substituted by organic radicals; and because of this fact a lesser quantity may be used for neutralization. Additionally, ammonia is comparatively non-toxic, and if ammonia is permitted to remain in the form of an ammonium halide, it is a harmless diluent.

Triethylamine is particularly useful because it is readily obtainable commercially, it is of a comparatively low molecular weight, and is in general highly useful as it causes rapid solubilization and is easily manipulated. Other amines, such as diethylamine, tri-n-butylamine, cyclohexylamine, morpholine, di-n-propylamine, beta-phenylethylamine, ethanolamine, isoamylamine, and ethyl morpholine, dimethylbenzylamine, 2-aminopyridine, iso-butylamine, dicyclohexylamine, diethanolamine, triethanolamine, beta-di-ethylaminoethanol, and trimethylamine, and mixtures of any of the suitable bases give satisfactory results, although their recovery cost or scarcity renders them less desirable from a commercial standpoint.

In general, the amines which have an ionization constant of $10^{-7}$ or stronger (as bases) are satisfactory. Those with an ionization constant of $10^{-6}$ or stronger, are better because they operate more rapidly and insure greater solubility.

It is desirable that the solution be fairly close to neutral because chlortetracycline is subject to decomposition if it is permitted to become too basic, particularly in the presence of water, or when hot. With ammonia, or triethylamine, etc., the natural weaknesses of the base serves to prevent the solution from becoming too basic, even locally, during the preliminary mixing. Even with these, losses are reduced if the mixture is kept cool, e. g. 5° C. while on the alkaline side during processing.

The chlortetracycline, which may be either as a free base or any of its acid salts is normally most conveniently suspended in the solvent as a slurry, and thereto added the base with stirring, whereby the chlortetracycline is converted to its soluble form on the alkaline side, although of course, other orders of addition or mixing may be used.

The insoluble impurities which are usually present, unless unusual precautions had been previously taken to obtain their removal, may then be removed by filtration or other means. Color impurities which are present are removable with a decolorizing carbon or filteraid, which may be added at this time.

After the removal of the impurities, the chlortetracycline is separated from the clarified solution as the desired form. This may also be conveniently done at room temperature, although if the material is to remain for any length of time, it is desirable that it be fairly cool to prevent the chlortetracycline from decomposing, particularly if the material is in the more alkaline of the above-mentioned range. From this solution of the chlortetracycline, the material desired may be recovered in three forms, the acid form as specifically claimed in our Patent Number 2,671,806, the neutral form, and as an alkali salt.

For the recovery of neutral chlortetracycline, it is possible to add sufficient acid to lower the pH to within the neighborhood of 4 to 7.5 preferably about 6, at which point the neutral chlortetracycline is formed in the solution and may be separated therefrom. Whereas any of the solvents above mentioned may be used for the recovery of this neutral chlortetracycline, methanol and the cellosolves give solutions which, on partial neutralization so as to form the neutral chlortetracycline, causes the neutral chlortetracycline to come out in a form which is more readily separated from the solvent. With certain of the other solvents, there is more of a tendency for the formation of a gelatinous, or difficultly-filterable, precipitate.

For the recovery of the alkali salts, it is possible to, with the use of organic solvents, add water thereto and cause the chlortetracycline in the form of its alkali salt to become less soluble and precipitate out. For commercial yields, however, it is normally preferred to use an organic solvent, such as methanol, for the recovery of the alkali salt, rather than water alone. This procedure is particularly effective in forming the sodium and potassium salts.

The separation of the desired form of chlortetracycline may be fairly slow, so that complete solution of the chlortetracycline occurs, and with standing, particularly with cooling, separation of the desired form may occur without the necessity for diluting out the solvent.

Similarly, a transformation of form may be accomplished in too small a volume of solvent for complete solution.

After the separation of the chlortetracycline in the form of the desired salt, it is convenient that it be washed to remove the solvent, and any impurities, in accordance with the usual crystallization procedures. The solvent need not be the same as that in which the chlortetracycline was originally dissolved; but to simplify the problems of solvent recovery, it is most convenient to use the same solvent. It is convenient to wash the crystals as recovered, first with the solvent with which they were originally formed; then with a small quantity of water; and then with alcohol, although the order is not important. Water tends to remove any salts which may be present, such as those of ammonia or the amines which may have been formed simultaneously with the desired salt of chlortetracycline. The material is then dried for use.

To better exemplify certain specific modifications of our invention, specific examples are herewith set forth.

EXAMPLE 1

*Sodium chlortetracycline*

100 grams of a crude chlortetracycline hydrochloride was slurried in 500 cc. of 2-ethoxyethanol. Thereto was added 35.8 cc. of 10.8 normal sodium hydroxide, and the mixture stirred until solution resulted. Any insoluble impurities were removed by filtration and to the clear filtrate was added 100 cc. of distilled water. The mixture was allowed to stand, with stirring, for ½ hour at room temperature, and then placed in a chill room overnight. An orange-yellow precipitate formed, which was filtered, washed twice with a 6:1 2-ethoxyethanol-water wash mixture, and once with anhydrous ethanol. The crystals thus formed were dried over phosphorus pentoxide, and thereby was obtained a yield of 62 grams of orange-yellow crystals of the sodium salt of chlortetracycline, assaying 890 micrograms per milligram, according to the standard assay. The sodium salt is hygroscopic and must be kept dry to prevent its picking up an undue quantity of water.

EXAMPLE 2

*Chlortetracycline*

60 grams of a comparatively dry sodium chlortetracycline, assaying 890 micrograms per milligram, were slurried in 300 cc. of 2-ethoxyethanol. To the slurry was added 18.1 cc. of 6.8 normal hydrochloric acid, thereby resulting in a solution, which when diluted with an equal quantity of water, gave a pH of 6.75. To the 2-ethoxyethanol solution was added 600 cc. of distilled water, with stirring, over a period of 1 hour. The pH was found to be 7.7 and was adjusted to 7 with 3.0 cc. of the hydrochloric acid. The mixture was chilled for 2 hours, and the crystals formed removed by filtration and washed three times with water. The crystals were dried at room temperature over phosphorus pentoxide for 12 hours, and thereby was obtained a yield of 39.1 grams of neutral chlortetracycline, assaying 1100 micrograms per milligram. This is a recovery of 81% of the chlortetracycline activity.

EXAMPLE 3

*Sodium chlortetracycline*

A suspension was prepared of 30 grams of crude chlortetracycline hydrochloride and 150 cc. of 2-ethoxyethanol. To this suspension was added sufficient of 10 normal solution of sodium hydroxide to raise the pH to 8.5. The mixture was stirred rapidly, to prevent local over-alkalinization, and care was used to see to it that the entire amount of caustic was added within a short period. The solution was comparatively clear. Thereto was added 1 gram of decolorizing carbon, the mixture stirred, allowed to settle, and then filtered. Much of the color and many of the impurities were thereby removed.

To 50 cc. of this clear filtrate was added an equal volume of water, the mixture cooled with stirring, and allowed to stand overnight in a chilled chamber; and then the sodium salt of chlortetracycline which was thereby precipitated separated by filtration. The sodium salt was washed once with ethyl alcohol, then with ether, and dried. A pale, dry, yellow material was obtained.

EXAMPLE 4

*Chlortetracyline*

To a second 50 cc. portion of the filtrate, obtained in the preceding example, was added sufficient hydrochloric acid to lower the pH to 6.0. The mixture was stirred, and then there was added thereto 50 cc. of distilled water, and the mixture allowed to chill overnight in a refrigerator at 4° C. forming crystals. The thus crystallized chlortetracycline (neutral) was separated by filtration, washed once with water, once with ethyl alcohol, and then permitted to dry. A pale, yellowish, crystalline, neutral chlortetracycline was thereby obtained.

EXAMPLE 5

*Chlortetracycline*

50 grams of chlortetracycline, neutral, was suspended in 250 cc. of 2-ethoxyethanol. Sufficient 10 normal sodium hydroxide was added to raise the pH to 7.5. The mixture was warmed to about 40° C. to hasten solution. The solution was filtered from any insoluble impurities, and to the filtrate was added 250 cc. of water. Chlortetracycline (neutral) crystallized out rapidly. The long yellow needles of neutral chlortetracycline were removed by filtration, washed with 1:1 2-ethoxyethanol-water solution, then ethyl alcohol, then ether, and dried. A total of 35.3 grams of chlortetracycline were recovered as the neutral chlortetracycline with a potency of 950 micrograms per milligram.

EXAMPLE 6

*Chlortetracycline*

To 25 grams of chlortetracycline hydrochloride was added 200 milliliters of methanol and 6.4 milliliters of triethylamine, and the resulting mixture stirred to give a solution at a pH of 5.03. The insolubles were filtered off, and the filter washed with 25 milliliters of fresh methanol. To the solution was added 33 milliliters of water over a 15 minute period with constant stirring, and chlortetracycline, neutral, was thereby precipitated. Stirring was continued for an additional hour, and the material was kept at 4° C. overnight. The chlortetracycline (neutral) was filtered, washed twice with 25 milliliters of 85% methanol and dried in vacuo. A 90% recovery of chlortetracycline was obtained, calculated on the purity involved. The resulting material analyzed 1030 micrograms per milligram, using a starting material with an analysis of 850 micrograms per milligram.

EXAMPLE 7

Chlortetracycline

To 275 grams of chlortetracycline hydrochloride was added 2200 milliliters of anhydrous methanol, and 72 milliliters of triethylamine. The mixture was thoroughly stirred and found to have a pH of 5.3. The insolubles were removed by filtration and washed with 180 milliliters of methanol, the wash being added to the filtrate. The final volume of solution was 2540 milliliters. To this was added 20% by volume of distilled water, the mixture stirred, permitted to stand for 16 hours at 4° C., and the chlortetracycline thereby precipitated was filtered, washed twice with 250 milliliters of 80% methanol and dried in vacuo. There was obtained a unit yield of 95% of the total chlortetracycline originally present, and the final material was found to analyze 970 micrograms per milligram.

EXAMPLE 8

Chlortetracycline 25 grams of crude chlortetracycline hydrochloride were slurried in 200 milliliters of methanol. The pH was adjusted to 5.71 with 6.0 milliliters of ethyl morpholine. The solution was filtered, and the filter pad washed with 25 milliliters of methanol. Chlortetracycline was precipitated by the addition of 30 milliliters of water with stirring. After standing for 16 hours, the chlortetracycline was filtered, washed twice with 20 milliliters of 80% methanol and dried in vacuo. There was obtained a yield of 87% of material analyzing 1010 micrograms per milligram of chlortetracycline. The weight of the product was 19.8 grams.

EXAMPLE 9

Chlortetracycline

The above experiment was repeated except that ethanolamine was used as the nitrogenous base, and there was obtained 18.7 grams of chlortetracycline analyzing 990 micrograms per milligram.

EXAMPLE 10

Chlortetracycline

The above experiment was repeated using beta-phenylethylamine as the nitrogenous base, and there was obtained a yield of 19.6 grams of chlortetracycline with purity of 905 micrograms per milligram.

EXAMPLE 11

Chlortetracycline

The above experiment was repeated using triethylamine as the nitrogenous base, and there was obtained a yield of 19.4 grams of chlortetracycline analyzing 1000 micrograms per milligram.

EXAMPLE 12

Potassium chlortetracycline

To a slurry of 10 grams of chlortetracycline hydrochloride in 50 milliliters of methanol and 5 milliliters of water, 2 equivalents of 10 N aqueous potassium hydroxide was added. On slight warming a solution formed which was filtered to remove insolubles. After cooling in an ice bath for 15 minutes the resultant heavy precipitate was filtered off and washed with cold methanol and dried. A yield of 6.6 g. of the potassium salt of chlortetracycline was obtained on drying. This substance assayed 800 micrograms per milligram and was soluble to the extent of 10% in water.

EXAMPLE 13

Ammonium chlortetracycline

Four equivalents of 28% aqueous ammonia was added to a slurry of 5.0 grams of chlortetracycline hydrochloride in 30 milliliters of methanol. Although solution of the solids did not occur their crystalline structure was visibly altered. The slurry was stirred for three hours at 4° C. and filtered. The precipitate was washed with methanol and dried to yield 2.4 grams of the ammonium salt of chlortetracycline assaying 1030 micrograms per milligram. This material is water soluble unlike the neutral form of chlortetracycline.

Many obvious modifications, involving slight changes in temperatures, pressures, concentrates, etc., as well as minor mechanical modifications such as centrifugations or decantations instead of filtrations, etc., will suggest themselves to those skilled in the art.

We claim:

1. A process for the preparation of neutral chlortetracycline which comprises dissolving crude chlortetracycline hydrochloride in a solvent selected from the group consisting of lower-alkanols and lower-alkoxy-lower-alkanols by the addition of an amine having an ionization constant of $10^{-7}$ or greater at a pH in the range of 4–7.5, filtering to remove the insoluble impurities, and adding water to the solution whereupon purified neutral chlortetracycline precipitates.

2. A process for the preparation of neutral chlortetracycline which comprises dissolving crude chlortetracycline hydrochloride in a solvent selected from the group consisting of lower-alkanols and lower-alkoxy-lower-alkanols by the addition of a compound selected from the group consisting of triethylamine, ethyl morpholine, ethanolamine, and β-phenylethylamine at a pH in the range of 4–7.5, filtering to remove the insoluble impurities, and adding water to the solution whereupon purified neutral chlortetracycline precipitates.

3. A process as in claim 2 in which the amine is triethylamine.

4. A process as in claim 3 in which the solvent is methanol.

5. A process as in claim 3 in which the solvent is 2-ethoxyethanol.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,640,842 | Weidenheimer et al. | June 2, 1953 |
| 2,671,806 | Winterbottom et al. | Mar. 9, 1954 |

OTHER REFERENCES

Harned et al.: "Annals, N. Y. Acad. Sci." vol. 51, art. 2, Nov. 30, 1948, p. 183.